B. D. LODGE.
NUT LOCK.
APPLICATION FILED FEB. 15, 1910.
968,171.
Patented Aug. 23, 1910.
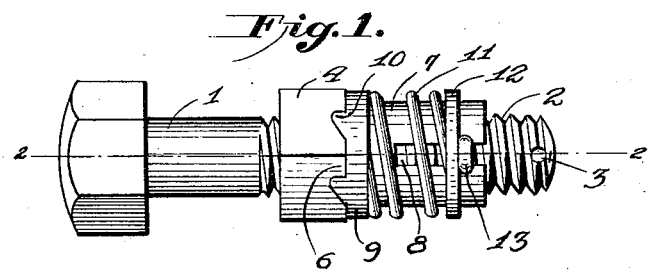
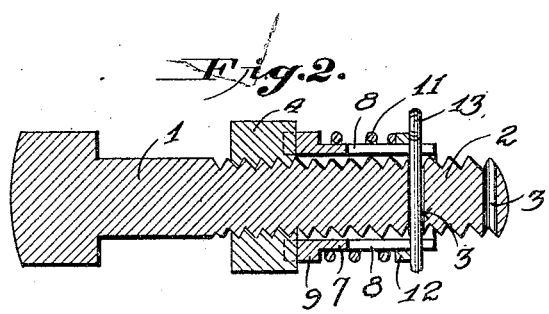
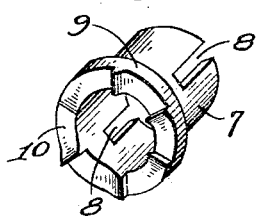
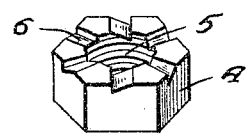
Witnesses
C. Everett Lancaster
Inventor
Burton D. Lodge,
By E. E. Vrooman
his Attorney

UNITED STATES PATENT OFFICE.

BURTON D. LODGE, OF MAGNOLIA, DELAWARE.

NUT-LOCK.

968,171.  Specification of Letters Patent.  Patented Aug. 23, 1910.

Application filed February 15, 1910. Serial No. 543,945.

*To all whom it may concern:*

Be it known that I, BURTON D. LODGE, citizen of the United States, residing at Magnolia, in the county of Kent and State of Delaware, have invented certain new and useful Improvements in Nut-Locks, of which the following is a specification, reference being had therein to the accompanying drawing.

This invention relates to nut locks, and the principal object of the same is to provide a simple device of the character stated that may be readily placed in locked or unlocked relation, and which will securely hold a nut in a locked position upon a bolt.

In carrying out the object of the invention generally stated above it will be understood, of course, that the essential features thereof are necessarily susceptible of changes in details and structural arrangements, one preferred and practical embodiment of which is shown in the accompanying drawings, wherein:—

Figure 1 is a view in side elevation of the improved nut lock. Fig. 2 is a central longitudinal sectional view taken on the line 2—2, Fig. 1. Fig. 3 is a detail perspective view of the improved locking sleeve. Fig. 4 is a similar view of the nut used in connection with this invention.

Referring to said drawings by numerals, 1 designates the bolt of the improved nut lock, the threaded portion 2 of which is provided with the spaced apart transversely arranged openings 3. The nut 4 used in the present invention has the usual central threaded bore 5 and its outer surface is provided with the ratchet teeth 6.

A sleeve 7 is provided with oppositely disposed longitudinally arranged side slats 8 and with an annular outstanding end flange 9, the end of which is provided with ratchet teeth 10 complemental to the ratchet teeth 6 of nut 4.

In assembling the improved nut lock, the nut 4 is screwed onto the threaded portion of bolt 1 and the sleeve 7 is fitted over the bolt with its ratchet teeth 10 in engagement with the teeth 6 of nut 4. A coiled spring 11 is then placed around sleeve 7 with one end bearing against the end flange 9 and its other end bearing against an abutment ring 12 loosely fitted around sleeve 7. Said spring 11 is then compressed and a locking pin or key 13 is passed through one of the openings 3 of the bolt 1 and through the slots 8 of sleeve 7, and forms a rest for ring 12 which is held in contact therewith by the pressure of spring 11.

It will be seen from the foregoing that the present invention provides means whereby the sleeve 7 is locked to bolt 1 so that relative rotation of the sleeve and bolt is prevented, and that the spring 11 is constantly exerting a pressure against the flanged end of said sleeve so that its toothed surface will be normally held in engagement with the similar surface of nut 4, thereby preventing rotation of said nut.

What I claim as my invention is:—

1. A device of the character described comprising a bolt provided with spaced transverse openings, a nut for said bolt having ratchet teeth on its top surface, a sleeve provided with oppositely disposed side slots and a toothed end for engagement with the teeth of said nut, a pin adapted to be passed through the slots of said sleeve and selectively through one of the openings of said bolt, a ring movable on said sleeve, and a spring coiled about said sleeve and interposed between said ring and the toothed end of said sleeve.

2. A device of the character described comprising a bolt provided with spaced transverse openings, a nut for said bolt having a toothed surface, a sleeve slidably fitted over said bolt and having an annular outstanding end flange provided with a toothed surface, said sleeve being also provided with oppositely disposed longitudinal side slots, a pin adapted to be passed through said slots and one of the openings of said bolt, a ring loose on said sleeve between said pin and the said end flange, and a spring coiled about said sleeve and having one end bearing against said ring and its other end bearing against said end flange.

In testimony whereof I hereunto affix my signature in presence of two witnesses.

BURTON D. LODGE.

Witnesses:
JAMES W. ARTHUS,
CHAS. DU PONT RIDGELY.